United States Patent [19]
Hattori et al.

[11] 4,257,014
[45] Mar. 17, 1981

[54] GAS LASER DISCHARGE TUBE USING CORRUGATED CATHODE

[75] Inventors: Shuzo Hattori, Nagoya; Noboru Kamide, Tokyo; Katumi Tokudome, Hidaka; Michio Ishikawa, Kawagoe; Yuzi Hayashi, Niiza, all of Japan

[73] Assignee: Kimmon Electric Co., Ltd., Tokyo, Japan

[21] Appl. No.: 966,857

[22] Filed: Dec. 6, 1978

[30] Foreign Application Priority Data

Oct. 6, 1978 [JP] Japan .................. 53-122724

[51] Int. Cl.³ .............................................. H01S 3/097
[52] U.S. Cl. ...................... 331/94.5 PE; 331/94.5 D
[58] Field of Search .................. 331/94.5 PE, 94.5 D, 331/94.5 G; 315/334, 337, 111; 330/4.3

[56] References Cited
U.S. PATENT DOCUMENTS

| | | | |
|---|---|---|---|
| 3,582,817 | 6/1971 | Gilson | 331/94.5 PE |
| 3,868,593 | 2/1975 | Fukuda et al. | 331/94.5 PE |
| 4,031,428 | 6/1977 | Tokudome et al. | 315/111 |
| 4,105,954 | 8/1978 | Wang et al. | 331/94.5 PE |

*Primary Examiner*—James W. Davie
*Attorney, Agent, or Firm*—Frishauf, Holtz, Goodman & Woodward

[57] ABSTRACT

A gas laser discharge tube comprises a discharge vessel containing a discharge gas, a rod-shaped anode, a corrugated cathode and a voltage source connected between the anode and cathode. The corrugated cathode comprises a metal hollow cylinder arranged coaxially with the optical axis of the laser and a plurality of metal discs arranged coaxially with the optical axis of the laser at regular intervals in the axial direction of the metal hollow cylinder. The discs have their peripheries secured to the inner periphery of the metal hollow cylinder. Each disc has a central hole and another hole through which the anode extends parallel to the optical axis of the laser.

10 Claims, 7 Drawing Figures

GAS LASER DISCHARGE TUBE USING CORRUGATED CATHODE

BACKGROUND OF THE INVENTION

This invention relates to an improved gas laser discharge tube wherein atoms or molecules of a discharge gas are excited to laser upper levels, and more particularly to a so-called "negative glow" gas laser discharge tube in which an active medium containing laser upper levels is produced in the negative glow part of the discharge.

A negative glow takes place closely along a cathode, and an oblong active medium is desirable. It is therefore desired that the laser discharge electrode have its cathode surface along the optical axis of laser. For this reason all the known negative glow lasers have a long cathode surface along the optical axis of the laser. They are called "transverse discharge" type glow lasers because the direction of discharge is transverse to their optical axis.

Most, not to say all, of the known negative glow lasers are classified as "hollow cathode lasers" having a narrow hollow cylindrical cathode through which the optical axis of the laser is running. One typical hollow cathode laser is described in W. K. Schuebel "Coaxial Hollow Cathode Laser" in IEEE Journal of Quantum Electronics, Vol. QE-6, 1969, pp. 574-575. Another typical hollow cathode laser is shown in Y. Sugawara and Y. Tokiwa "Multiple Anode Hollow Cathode Laser" in the Japanese Journal of Applied Physics, Vol. 9, 1970, pp. 588-589. A multiple anode hollow cathode laser is described by J. A. Piper and C. E. Webb in the Journal of physics D: Applied physics, Vol. 6, 1973, pp. 400-407.

The negative glow part of the discharge, which plays a great role in the negative glow lasers, appears very close to, but at a certain distance from, the cathode surface along the flow of discharge current. The distance is called "cathode dark space length" and is, as well known, determined by the kind of discharge gas, the material of the discharge cathode and the shape of the discharge cathode. The cathode dark space length is usually reduced at a high current density. It is intensively reduced when the discharge cathode is hollow cylindrical so that an ultraviolet radiation on its cathode surface effectively produces electrons discharging from the cathode surface. If the cathode dark space length is reduced, the negative glow part of the discharge will favorably be enclosed in the hollow cylindrical cathode. This phenomenon is called "hollow cathode effect" and explains why a hollow cylindrical cathode is suitable for a gas laser discharge tube.

An improved hollow cathode laser which gives an axial electric field to a discharge tube having a transverse electric field only is disclosed in U.S. Pat. No. 4,031,428. In this improved laser, the hollow consists of a plurality of cathode elements, and the anode consists of a plurality of anode elements. The cathode elements and the anode elements are alternately arranged, so that each cathode element is connected to an anode element which is connected to the next cathode element. An axial electric field is generated between the adjacent cathode and anode electrodes. The axial electric field is effective to distribute heavy atoms uniformly along the optical axis of the laser. Since the cathode is constituted by a plurality of elements, the probability is reduced that discharge becomes an arc discharge.

SUMMARY OF THE INVENTION

An object of the invention is to provide a gas laser discharge tube wherein the laser gain per unit length of laser optical axis is increased by increasing the discharge current density per unit length of the laser optical axis, not per unit area of the cathode. To achieve the object, use is made of a corrugated hollow cylindrical cathode, thus increasing the area of cathode surface per unit length of the discharge tube along the optical axis of the laser. The corrugations are so shaped as to produce a hollow cathode effect efficiently in the space among them.

Although the optical axis of the laser does not pass through the negative glow part developed in the space among the corrugations, the electron density or the excited atom density in the corrugated hollow cylindrical cathode is more effectively elevated than in a hollow cylindrical cathode without corrugations, as more and more current is supplied. The corrugated hollow cylindrical cathode proves advantage in the following two cases.

First, if a rare gas is used as the discharge gas, the corrugated hollow cylindrical cathode can maintain discharge stably even at a very small pressure-gap product (p-d product) region and is therefore effective in generating a laser beam using two rare gas ion-spectrum beams. Second, if a mixture of rare gas metal vapors is used as the discharge gas, the corrugated hollow cylindrical cathode is most desirable for a metal iron laser since it can elevate the rare gas ion density and the medium-energy electron density.

Another object of the invention is to provide a gas laser discharge tube having a plurality of corrugated hollow cylindrical cathodes which are arranged in tandem for applying an axial electric field between any two adjacent cathodes. In the improved hollow cathode laser as disclosed in U.S. Pat. No. 4,013,248, the voltage between any adjacent cathode element and anode element must be equal. In the gas laser discharge tube according to the invention, the voltage between any two adjacent corrugations of the hollow cylindrical cathode need not be equal. It is sufficient that the voltage is equal to an integral fraction of the voltage between any adjacent cathode and anode elements of the improved hollow cathode laser. Moreover, the corrugated hollow cylindrical cathode is much easier to manufacture than a hollow cathode constituted by a plurality of cathode elements.

A gas laser discharge tube according to the invention comprises a discharge vessel filled with a discharge gas for producing a laser active medium to be excited by discharge, a plurality of discharge cathodes each comprising a corrugated hollow cylinder through which the optical axis of the laser runs, a plurality of discharge anodes each having a plurality of anodic surfaces each located between two adjacent corrugations of the discharge cathode, and a power source for applying voltage between each discharge cathode and the adjacent discharge anode, to thereby achieve gas laser discharge.

DETAILED DESCRIPTION OF THE PREFERRED EMBODIMENTS

Figure 1:
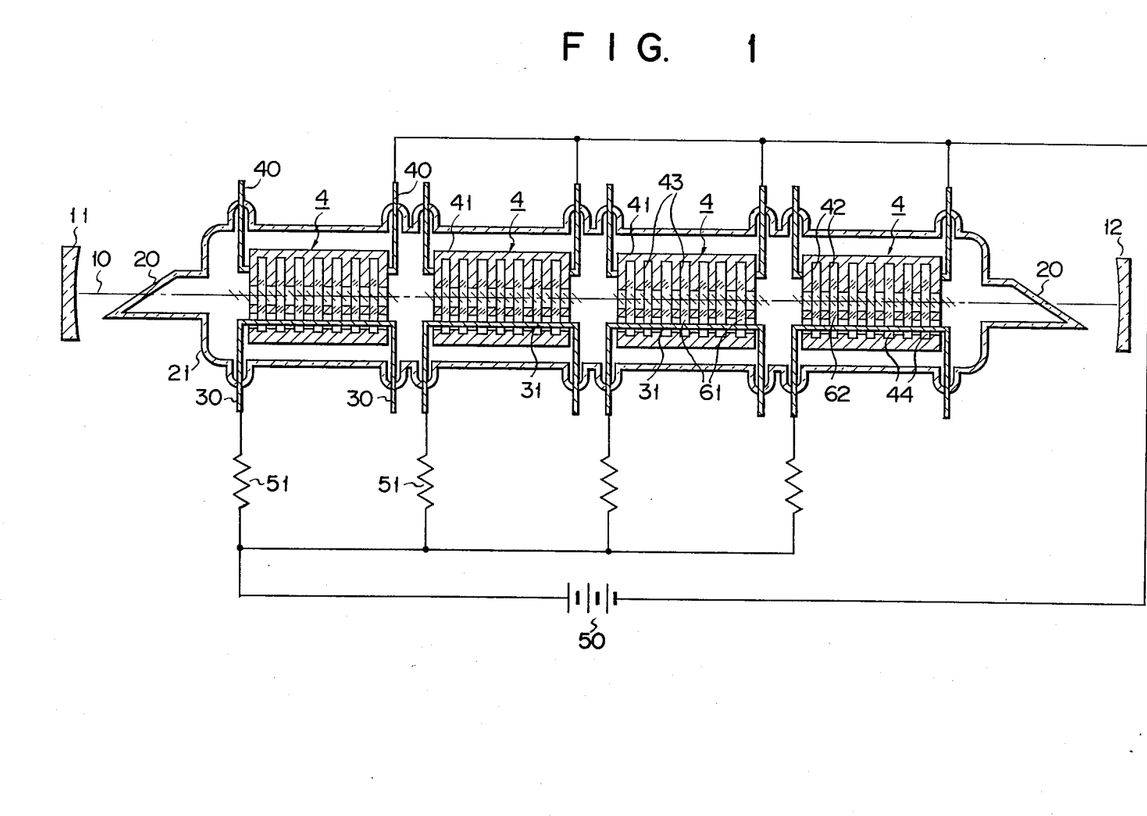
FIG. 1 is a schematic cross sectional view of a first embodiment of the invention having a rod-shaped anode.

As shown in FIG. 1, a gas laser discharge tube according to the invention comprises a concave coupling mirror 11 and a concave full-reflection mirror 12. These mirrors 11 and 12 constitute a laser resonator, the optical axis 10 of which passes the center of curvature of the mirror 11 and that of the mirror 12. The gas laser discharge tube further comprises a tubular discharge vessel 21 having two Brewster windows 20, through which a straight optical axis 10 extends. The discharge vessel 21 has four pairs of anode stems 30 protruding in the radial direction of the vessel 21. Each pair of anode stems 30 supports a rod-shaped anode 31 extending parallel to the optical axis 10. The discharge vessel 21 further has four pairs of cathode stems 40. Each pair of cathode stems 40 support a corrugated cathode 4 disposed in the discharge vessel 21. Thus, four corrugated cathodes are provided.

Each corrugated cathode 4 comprises a hollow metal cylinder 41 coaxial with the optical axis 10 and a plurality of discs 42 having a center hole of diameter D. The discs 42 are arranged coaxial with the optical axis 10 at regular intervals and have their outer peripheries attached to the inner periphery of the hollow metal cylinder 41. Any adjacent two discs 42 define a space 43 having a width w. The width w is smaller than D and twice or more larger than a cathode dark space length d at a given circuit density j. That is:

$$D > w > 2d(j) \quad (1)$$

"$d(j)$" in equation (1) is expressed as follows:

$$d(j) = (1.25/A \cdot p) \ln[1 + (1/r_{eff}(j))] \quad (2).$$

In equation (2) A denotes Townsend's A-coefficient, p the pressure of the discharge gas, and $r_{eff}$ the charge regeneration coefficient on the cathode surface which depends on the current density and the structure of the cathodes 4.

The discs 42 each have an anode hole 44. The anode holes 44 of the discs 42 are coaxial with one another so that the rod-shaped anode 31 extends straight through them, leaving a gap g much less than d(0) given to $r_{eff}$ at low current density or cationic r-coefficient. Namely:

$$g < d(0) \quad (3)$$

Disposed as illustrated in FIG. 1, the four corrugated cathodes 4 and the four rod-shaped anodes 31 constitute four electrode pairs.

Across each electrode pair a voltage is applied from a voltage source 50 through a stabilizing resistor 51. Since the width w is selected to satisfy equation (1), a remarkable negative glow 61 is maintained in each space 43. In other words, photoelectrons are emitted from the surfaces of the two discs 42 defining the space 43 to achieve an efficient hollow cathode effect in the space 43, and a negative glow of a high current density is entrapped in the space 43. No discharge develops in the anode hole gap g, however. This is because so many positive ions are not produced in the narrow gap g as to maintain a continuous discharge. The cylindrical space of diameter D parallel to the optical axis 10 is filled with a diffusion plasma 63 which is formed of electrons, positive ions and many excited atoms of the discharge gas supplied from the annular negative glows 61 surrounding the cylindrical space of diameter D. The discharge being achieved in this way, the present invention provides a higher laser gain than does the conventional hollow cathode discharge.

Figure 2:
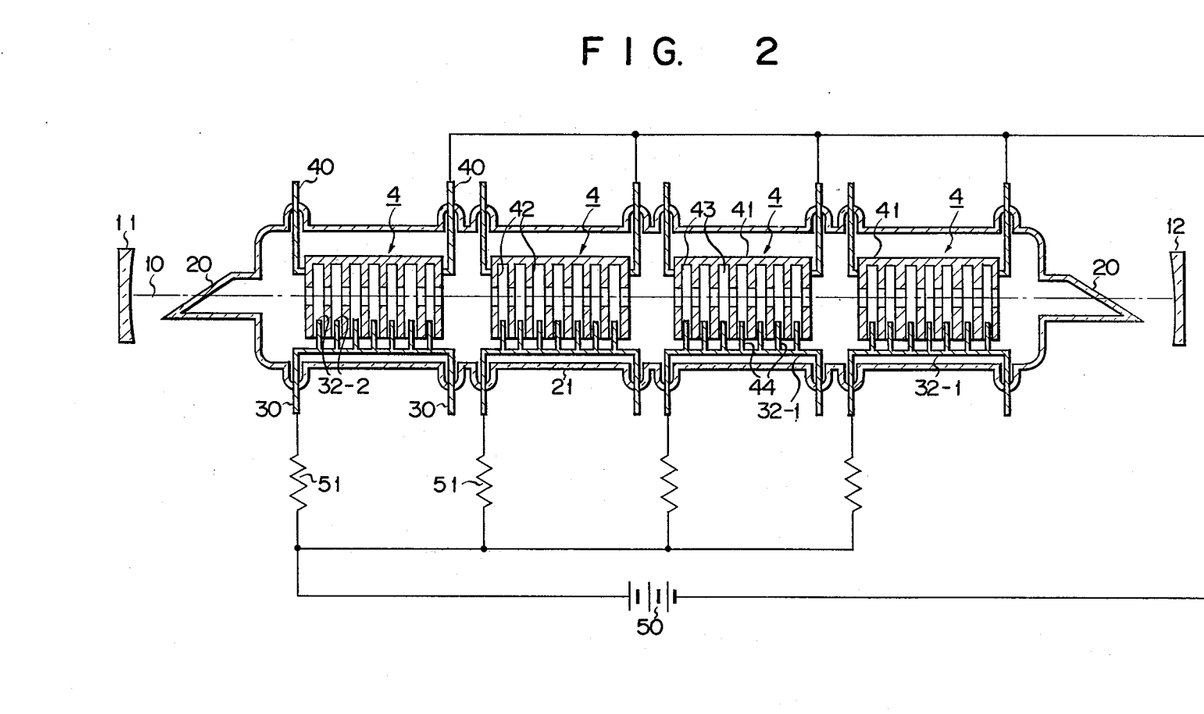
FIG. 2 is a schematic cross sectional view of a second embodiment of the invention having a pin-shaped anode.

The gas laser discharge tube shown in FIG. 2 is identical with the tube illustrated in FIG. 1 except that pin-shaped anodes 32 are used in place of rod-shaped anodes. Each pin-shaped anode 32 comprises a rod 32-1 supported by a pair of anode stems 30 and extending parallel to the optical axis 10 and a plurality of pins 32-2 supported by the rod 32a. The pins 32 extend into spaces 43 among the discs 42 of a corrugated cathode 4 through anode holes 44 formed in the hollow metal cylinder 41 of the corrugated cathode 4. Each pin 32-2 is loosely extending through the corresponding anode hole 44, leaving a gap g satisfying equation (3). A strong electric field is generated about the free end of each pin 32b and serves to lower the starting voltage of discharge and to maintain a stable discharge.

Figure 3:
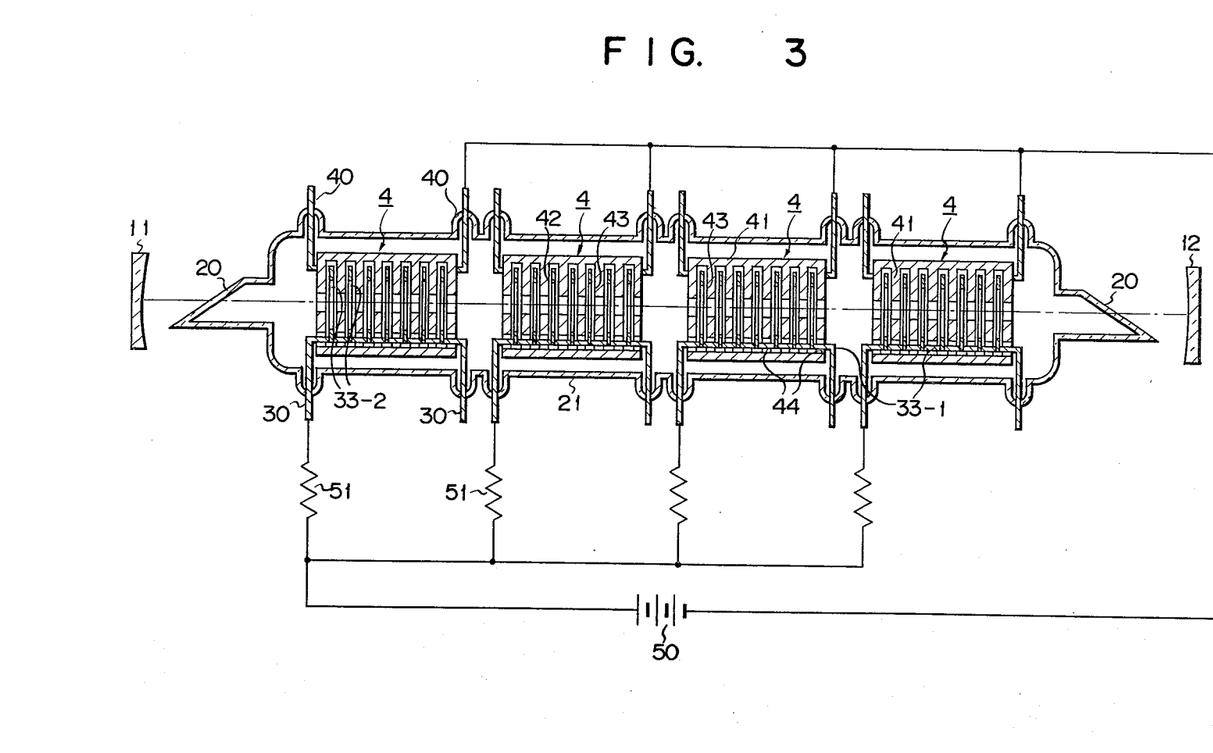
FIG. 3 is a schematic cross sectional view of a third embodiment of the invention having a ring-shaped anode.

The gas laser discharge tube shown in FIG. 3 is identical with the tube illustrated in FIG. 1 except that ring-shaped anodes 33 are used in place of rod-shaped anodes. Each ring-shaped anode 33 comprises a rod 33-1 supported by a pair of anode stems 30 and extending parallel to the optical axis 10 and a plurality of rings 33-2 supported by the rod 33-1. The discs 42 constituting each corrugated cathode 4 each have a hole. The holes of the discs 42 are coaxial with one another so that the rod 33-1 extends straight through them, leaving a gap g satisfying equation (3). The rings 33-2 are positioned coaxially with the discs 42 and in the respective spaces 43 among the discs 42. Each ring 33-2 generates a strong electric field which lowers the starting voltage of discharge and maintains a stable discharge. In addition, since the rings 33-2 are positioned coaxially with the optical axis 10, the resultant discharge is desirably symmetrical with respect to the optical axis 10.

Figure 4:
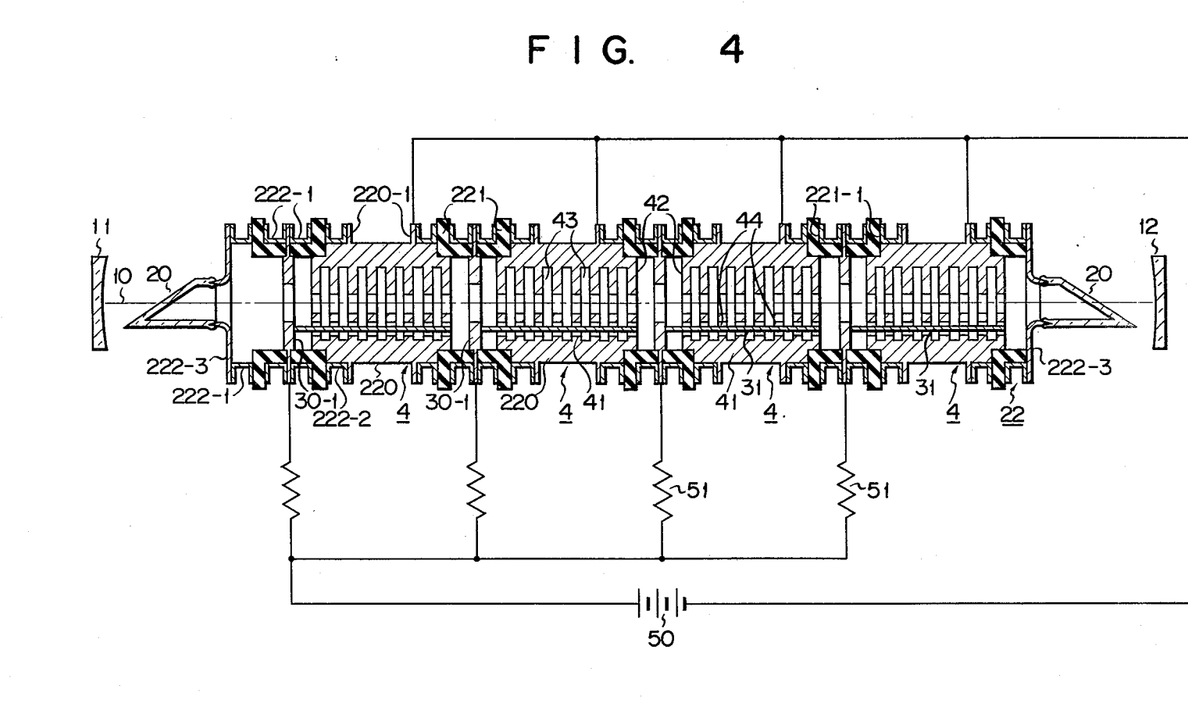
FIG. 4 is a schematic cross sectional view of a fourth embodiment of the invention having a rod-shaped anode and a metal-ceramic discharge vessel.
Figure 5:
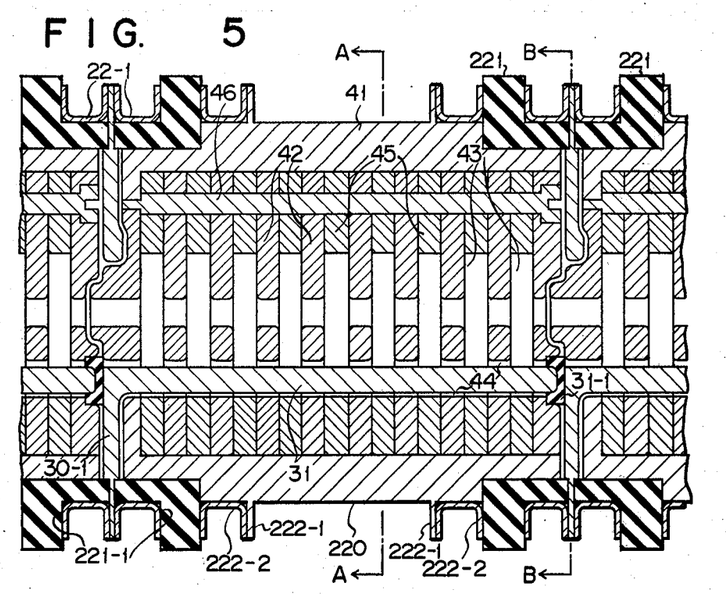
FIG. 5 shows one of the electrode stages of the gas laser discharge tube illustrated in FIG. 4.
Figure 6:
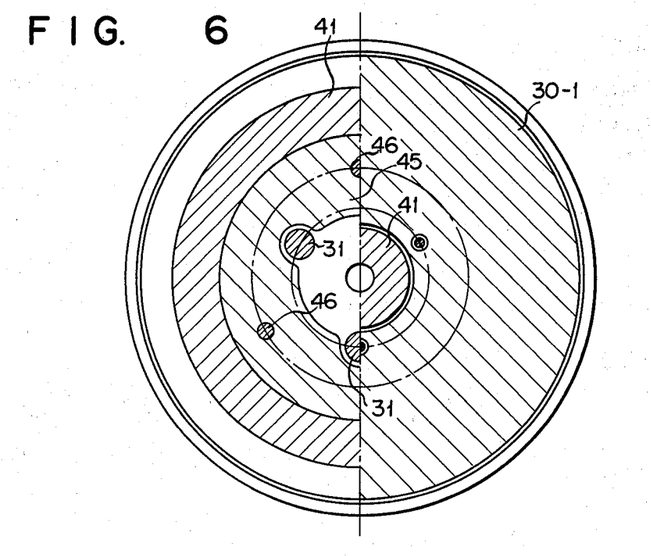
FIG. 6 shows a cross sectional view of the electrode stage shown in FIG. 5, taken along line a—a and a cross sectional view of the electrode stage, taken long line b—b.

The gas laser discharge tube shown in FIGS. 4, 5 and 6 differs from the tube illustrated in FIG. 1 in that no glass discharge tube is used and that three rod-like anodes are used. The tube has a metal-ceramic discharge vessel 22 which comprises four cathode cylinders 41, nine ceramic seal rings 221, eight metal seal rings 222-1, ten metal seal rings 222-2, a pair of end seal rings 222-3 and four anode end plates 30-1. To the end seal rings 222-3 two Brewster windows 20 are sealed in an airtight fashion, respectively. All the members constituting the metal-ceramic discharge vessel 22 are put together coaxially.

Each ceramic seal ring 221 has metalized sides 221-1 and 221-2. The metal seal rings 222-1 form four pairs for supporting the anode end plates 30-1, respectively. The metal seal rings 222-2 are to support the cathode cylinders 41. The rings 222-1 are soldered to the metalized sides 221-1 of the ceramic seal rings 221, respectively, thereby sandwiching the anode end plates 30-1. The rings 222-2 are attached on the outer peripheral surface 220 of the cathode cylinders 41. The rings 222-2 are soldered at one side to the metalized sides 221-2 of the ceramic seal rings 221 and welded at the other side to sealing fins 220-1 which are integrally formed with the cathode cylinders 41.

FIG. 5 shows in detail the electrode structure and sealing means constituting one electrode stage of the gas discharge tube schematically illustrated in FIG. 4. FIG. 6 shows a cross sectional view of the electrode stage of FIG. 5 taken along line A—A in FIG. 5 and a cross sectional view of the same taken along line B—B.

As shown in FIGS. 5 and 6, the three rod-shaped anodes 31 extend parallel to the optical axis 10 and are spaced from one another equidistantly in the circumferential direction of the gas laser discharge tube. They are welded at one end to the anode end ring 30-1 and are supported at the other end by three insulative caps 31-1, respectively. The corrugated anode 4 comprises a hollow metal cylinder 41 and a plurality of discs 42. The hollow metal cylinder 41 is coaxial with the optical axix 10. The discs 42 are arranged coaxial with the optical axis 10 at regular intervals, spaced from one another by spacer rings 45 and fixed to the hollow metal cylinder 41 by bolts 46. The discs 42 each have a central hole and three anode holes 44 which are aligned with the corresponding anode holes 44 of any other discs. The spacer rings 45 provide spaces 43 among the discs 42. Through these anode holes 44 and spaces 43 the rod-shaped anodes 31 extend parallel to the optical axis 10.

Every corner of the rod-shaped anodes 31, anode end ring 30-1, insulative caps 31-2, cylinder 41, discs 42 and spacer rings 45 is rounded to reduce the chance of flushing over. Any portions of the ceramic sealing rings 221 or the insulative caps 31-1 are not exposed to a high density current flow and are not contaminated with cathode sputtering. The metal-ceramic discharge vessel 22 is advantageous over a glass discharge vessel in that it can effectively dissipate the heat generated by each electrode.

Figure 7:
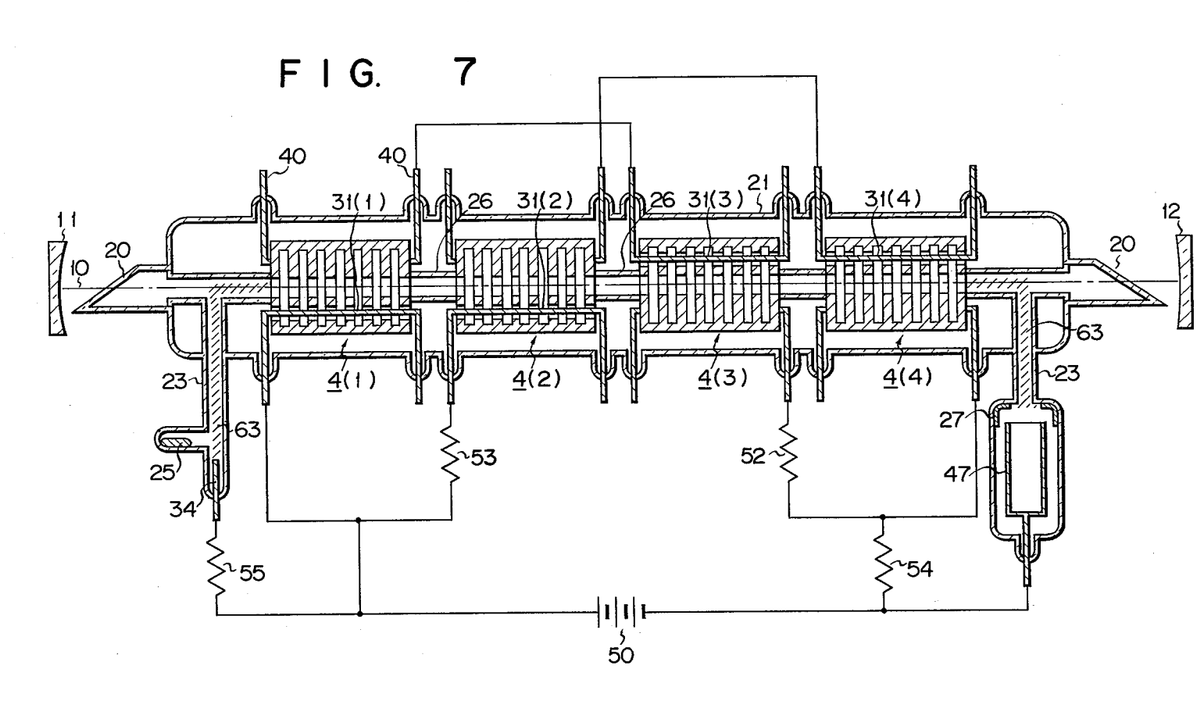
FIG. 7 is a schematic cross sectional view of a fifth embodiment of the invention which generates an axial electric field in the space between any adjacent two corrugations of the cathode.

The gas laser discharge tube shown in FIG. 7 differs from the tube illustrated in FIG. 1 in that an axial field discharge takes place between adjacent corrugated cathodes. Each electrode stage is identical with that of the tube shown in FIG. 1 both in construction and function, but the voltage supply to its constituting electrodes is effected in a different way. A first electrode stage comprises a first anode 31(1) and a first corrugated cathode 4(1), a second electrode stage a second anode 31(2) and a second corrugated cathode 4(2), a third electrode stage a third anode 31(3) and a third corrugated cathode 4(3), and the fourth electrode stage the fourth anode 31(4) and the fourth corrugated cathode 4(4). The first electrode stage has its cathode 4(1) connected to the anode 31(3) of the third electrode stage. The second electrode stage has its cathode 4(2) connected to the anode 31(4) of the fourth electrode stage. The anodes 31(1) and 31(2) of the first and second electrode stages are connected to each other via an anode bias resistor 53, thus forming a branch circuit. The cathodes 4(3) and 4(4) of the third and fourth electrode stages are connected to each other via a cathode bias resistor 52, thus forming another branch circuit. The branch circuits are connected in parallel to each other through a voltage source 50. From the voltage source 50 a voltage is applied to both branch circuits via a common cathode resistor 54. A voltage drop across both bias resistors 52 and 53 sets the potential of the second anode 31(2) exactly halfway between the potentials of the first anode 31(1) and first cathode 4(1). Thus, half the voltage across the cathode and anode of each electrode stage is applied between any two adjacent corrugated cathodes.

The gas laser discharge tube of FIG. 7 further comprises a cataphoresis anode 34 and a cataphoresis cathode 47. The cataphoresis anode 34 is supported by a sealed tube 23 which extends from the glass discharge tube 21. The cataphoresis cathode 47 is supported in a sealed tube 24 which extends from the glass discharge tube 21. A voltage is applied via a common anode resistor 55 between the cataphoresis anode 34 and the first corrugated cathode 4(1) to maintain a positive column 63 in both sealed branch tubes 23 and 24. A metal reservoir 25 is provided to communicate with the sealed branch tube 23 and is spaced away from the cataphoresis anode 34. The reservoir 25 contains a metal, which is heated to provide metal vapor. The metal vapor is supplied into the first corrugated cathode 4(1) by cataphoresis effect. Between any adjacent two corrugated cathodes an inter-stage tube 26 is provided coaxially with the glass discharge tube 21 so as to carry metal vapor from one electrode stage to another by virtue of cataphoresis effected by an axial field discharge between the corrugated cathodes. A voltage drop across common cathode resistor 54 provides a voltage between the fourth corrugated cathode 4(4) and the cataphoresis cathode 47. This voltage maintains the positive column 63 in the sealed branch tube 24. The metal ions recombine with electrons to form neutral metal atoms, which are deposited in a metal sinc 27, a part of the sealed tube 24. The metal sinc 27 is cooled enough to keep the metal vapor pressure very low.

From the above it will be understood that in a multistage hollow cathode discharge it is not always necessary to connect the cathode of one stage to the anode of the next stage to thereby effect an axial field discharge between the cathodes of the adjacent stages.

The gas laser discharge tube of FIG. 7 is effective especially for lasers using rare gases and metal vapor, such as a helium cadmium laser in which it is necessary to maintain a constant metal vapor pressure in the discharge vessel.

As the detailed description of the embodiments shows, a discharge tube having a long service life and a high laser gain is realized by corrugated cathodes and it is possible to generate an axial field discharge in such a discharge tube to thereby provide a desirable heavy atom vapor flow.

What we claim is:
1. A gas laser system comprising:
a generally tubular discharge vessel filled with a discharge gas for producing a laser active medium to be excited by discharge;
an optical cavity for amplifying stimulated emissions transmitted from said laser active medium, the optical cavity defining an optical axis;

a plurality of discharge cathodes in said discharge vessel, each comprising a corrugated hollow cylinder through which runs said optical axis;

a plurality of discharge anodes each having a plurality of anodic surfaces, each anodic surface being located between two adjacent corrugations of the discharge cathode; and a power source for applying voltage between each discharge cathode and the adjacent discharge anode to thereby achieve gas laser discharge.

2. A gas laser system according to claim 1, wherein the corrugations of each of said discharge cathodes have holes coaxially aligned with one another and each of said discharge anodes is a metal rod extending through said holes in parallel to the optical axis of the laser.

3. A gas laser system according to claim 1, wherein each of said discharge cathodes has a plurality of holes and each of said discharge anodes includes a plurality of pins which exdend through said holes into the spaces among the corrugations of the discharge cathode.

4. A gas laser system according to claim 1, wherein the corrugations of each of said discharge cathodes have holes coaxially aligned with one another and each of said discharge anodes comprises metal rod extending through said holes in parallel to the optical axis of the laser and a plurality of metal rings supported by the metal rod and arranged in the spaces among the corrugations of the discharge cathode.

5. A gas laser system according to claim 1, wherein the width w of a space between any two adjacent corrugations of each discharge cathode is smaller than the inner diameter D of the corrugations and more than twice as large as a cathode dark space length $d(j)$ at a given current density j, $d(j)$ being expressed as follows:

$$d(j) = (1.25/A \cdot p) \ln[1 + (1/r_{eff}(j))],$$

where A denotes Townsend's A-coefficient, p the pressure of discharge gas and $r_{eff}(j)$ the charge regeneration coefficient at current density j.

6. A gas laser system according to claim 2, wherein between each anode and the holes of the corrugations there is provided a gap g which is smaller than a cathode dark space length $d(0)$, which is expressed as follows:

$$d(0) = (1.25/A \cdot p) \ln[1 + (1 + r_{eff}(0))],$$

where A denotes Townsend's A-coefficient, p the pressure of discharge gas and $r_{eff}$ the charge regeneration coefficient.

7. A gas laser system according to claim 1, wherein each discharge cathode and each discharge anode comprise an electrode stage, thereby providing a plurality of electrode stages which are arranged in said discharge vessel coaxially with said optical axis.

8. A gas laser system according to claim 7, wherein said discharge gas is a mixture gas including a heavy atom vapor supplied from a metal reservoir provided at one end of said discharge vessel, and a voltage is supplied from said power source to said discharge cathodes so as to cause potential difference between any adjacent two discharge cathodes, whereby the heavy atom vapor flows from one cathode to another by virtue of cataphoresis effect obtained by an electric field along said optical axis.

9. A gas laser system according to claim 1, wherein said discharge vessel comprises a glass envelope.

10. A gas laser system according to claim 1, wherein said discharge vessel comprises a metal-ceramic vessel comprising a plurality of metal hollow cylinders and a plurality of ceramic hollow cylinders.

* * * * *